(12) United States Patent
Capewell et al.

(10) Patent No.: US 6,941,047 B2
(45) Date of Patent: Sep. 6, 2005

(54) SYSTEM AND METHOD FOR COLLIMATING AND REDIRECTING BEAMS IN A FIBER OPTIC SYSTEM

(75) Inventors: Dale Capewell, Agoura Hills, CA (US); Sam Beizai, Sherman Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/790,573

(22) Filed: Mar. 1, 2004

(65) Prior Publication Data

US 2004/0165828 A1 Aug. 26, 2004

Related U.S. Application Data

(62) Division of application No. 10/003,075, filed on Oct. 31, 2001, now Pat. No. 6,751,379.
(60) Provisional application No. 60/244,941, filed on Nov. 1, 2000.

(51) Int. Cl.[7] .................................................. G02B 6/26
(52) U.S. Cl. ............................. 385/47; 385/33; 398/85; 398/48; 398/88
(58) Field of Search ........................ 385/27, 31, 33–36, 385/39, 47, 129, 49; 398/41, 48, 79, 82–86, 88

(56) References Cited

U.S. PATENT DOCUMENTS

| | | | |
|---|---|---|---|
| 4,244,045 A * | 1/1981 | Nosu et al. .................... | 398/86 |
| 4,252,294 A | 2/1981 | Uchio | |
| 4,883,333 A | 11/1989 | Yanez | |
| 5,159,491 A | 10/1992 | Richards | |
| 5,345,336 A | 9/1994 | Aoyama et al. | |
| 5,742,720 A | 4/1998 | Kobayashi et al. | |
| 6,269,203 B1 * | 7/2001 | Davies et al. ................. | 385/24 |
| 6,296,203 B1 | 10/2001 | Manteiga et al. | |
| 6,396,978 B1 * | 5/2002 | Grann ........................ | 385/24 |
| 6,620,154 B1 | 9/2003 | Amirkhanian et al. | |
| 2002/0067886 A1 * | 6/2002 | Schaub ....................... | 385/33 |

FOREIGN PATENT DOCUMENTS

| EP | 0 613 032 A2 | 2/1994 |
|---|---|---|
| EP | 0 857 992 A2 | 4/1997 |
| EP | 1 004 907 A2 | 7/1999 |

* cited by examiner

*Primary Examiner*—Akm Enayet Ullah
*Assistant Examiner*—Kevin S. Wood
(74) *Attorney, Agent, or Firm*—Pillsbury Winthrop Shaw Pittman LLP (57) ABSTRACT

A connector to an optical fiber comprises a prism, a ferrule and an aspheric lens. The prism includes a triangular wedge element having a first surface, a second surface and a base. The ferrule guides the optical fiber so as to contact the optical fiber with the first surface of the prism. The aspheric lens is integrated on the second surface, the integrated aspheric lens being positioned so that the prism serves to redirect a light beam at an angle relative to an axis of the optical source input through total internal reflection by utilizing the base of the triangle wedge element. The aspheric lens serves to collimate the redirected light beam or focus the light beam before being redirected. This arrangement may, for example, be used within a WDM system to multiplex and de-multiplex several wavelengths of light, using a "zig-zag" optical path configuration and thin film filters to separate the wavelengths.

11 Claims, 12 Drawing Sheets

SYSTEM AND METHOD FOR COLLIMATING AND REDIRECTING BEAMS IN A FIBER OPTIC SYSTEM

RELATED APPLICATIONS

This application is a divisional application of U.S. patent application Ser. No. 10/003,075, filed Oct. 31, 2001, now U.S. Pat. No. 6,751,379. This appliction claims the benefit of provisional application No. 60/244,941, filed Nov. 1, 2000.

BACKGROUND OF THE INVENTION

1. Field of the Invention

The present invention relates to optical communications, and more particularly, to a system and method for collimating and redirecting beams in a fiber optic system.

2. Discussion of the Related Art

Figure 1A:
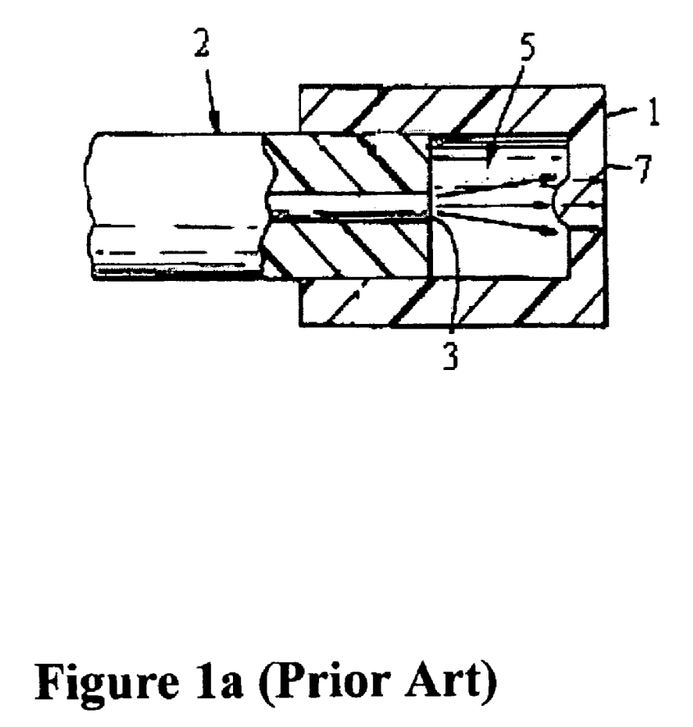
FIG. 1a illustrates a cross-sectional view of a prior optical fiber-connector assembly.
Figure 1B:
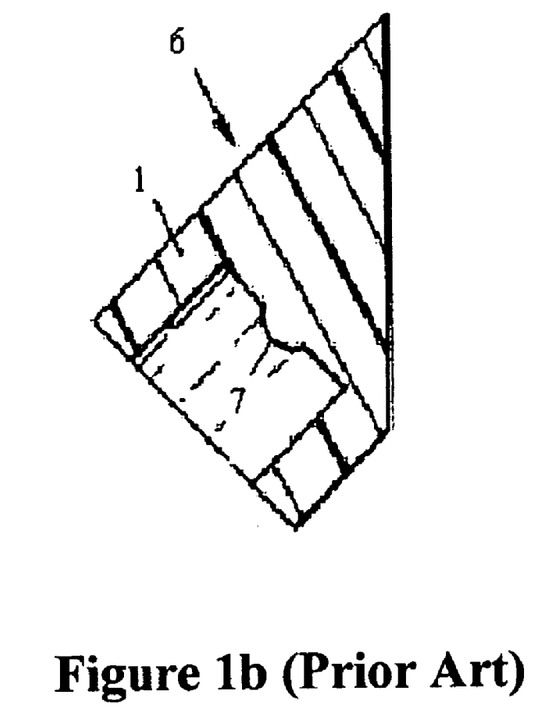
FIG. 1b illustrates a cross-sectional view of another prior optical fiber-connector assembly.

The integration of aspheric lenses within connectors designed to couple light beams from one optical fiber to another, and manufacturable using injection molding of optically transparent plastic, is well known. These applications generally address the need to maintain alignment between the axis of an optical fiber and a light beam output therefrom. One group of previous known designs describes the placement of a concentric plano-convex lens with the flat side of the lens near or against a fiber core. Another group of known designs is shown in FIG. 1a. This type utilized the placement of plano-convex lens with the flat side away from a fiber core and an air gap cavity separating the lens and the fiber. Shown in FIG. 1a is a cross-sectional view of a prior optical fiber-connector assembly, comprising the integration of an optical fiber 2 having a fiber core 3 with a fiber connector housing 1. The optical fiber 2 and a collimating lens 7 are positioned so that a cavity 5 is formed between them, with the flat side of the collimating lens 7 being away from the fiber core 3. As an extension to the design shown in FIG. 1a, the design in FIG. 1b illustrates the use of a wedge 6 to redirect the beam at 45° using total internal reflection (TIR) after the beam is collimated by the collimating lens 7.

Similar assemblies designed to couple light directly from a vertical cavity surface emitting laserdiodes (VCSEL) into a multimode fiber and/or couple light from an optical fiber directly onto a photodetector also appear in the prior art. One such assemblies has a design with a concentric TO can ferrule, lens, and fiber ferrule elements. Designs of this nature, applying specifically to coupling between VCSELs and photodiodes mounted inside TO cans and optical fibers, are devised for use in serial data links rather than wavelength division multiplexing (WDM) systems.

More recent designs involving wavelength division multiplexers (WDM) employing thin film filter (TFF) channel separation and a "zig-zag" configuration may be subdivided into two types of designs. The first type of designs centers around the use of optical waveguides, consisting of regions of high index material (core) surrounded by a lower index material (cladding), to route the light along the "zig-zag" waveguides. The second type of designs involves those designs that depend on collimation and free-space "zig-zag" optical routing. In implementation, the collimation, redirection, and focusing of light relevant to the second type of designs, or the free-space "zig-zag" multiplexer/demultiplexer designs, differ drastically from the first type of designs, or the waveguide-based solutions. Prior art involving TFF-based wavelength division multiplexers (WDM) that employ a free-space "zig-zag" configuration generally applies to fiber-to-fiber applications such as optical switches, branch filters, and add-drop multiplexers. Most of these designs have a planar topology that is not well suited for current injection molding technology. Therefore, there is a need for a system and method that utilize free-space "zig-zag" optical routing while being suited for current injection molding technology.

There is little, if any, prior art that describes a design for a TFF-based optical WDM transceiver that uses injection molding of transparent plastic to construct an integrated optical assembly. One example of a related design was presented by B. Wiedemann at the IEEE 802.3ae Interim Meeting in 2000. The input collimator of this design is consistent with the air-gap cavity design mentioned earlier with respect to FIGS. 1a and 1b. A serious disadvantage of this design and the designs of FIGS. 1a and 1b is the absence of a ferrule to guide the fiber along the axis of a collimating lens. A small shift in fiber position results in a serious misalignment of the collimated beams. If standard injection molding techniques were used to manufacture the design, addition of the ferrule that is necessary to refine the design would be extremely difficult because shaping the lens and ferrule on the same "slide" would generate an undercut condition.

Figure 2:
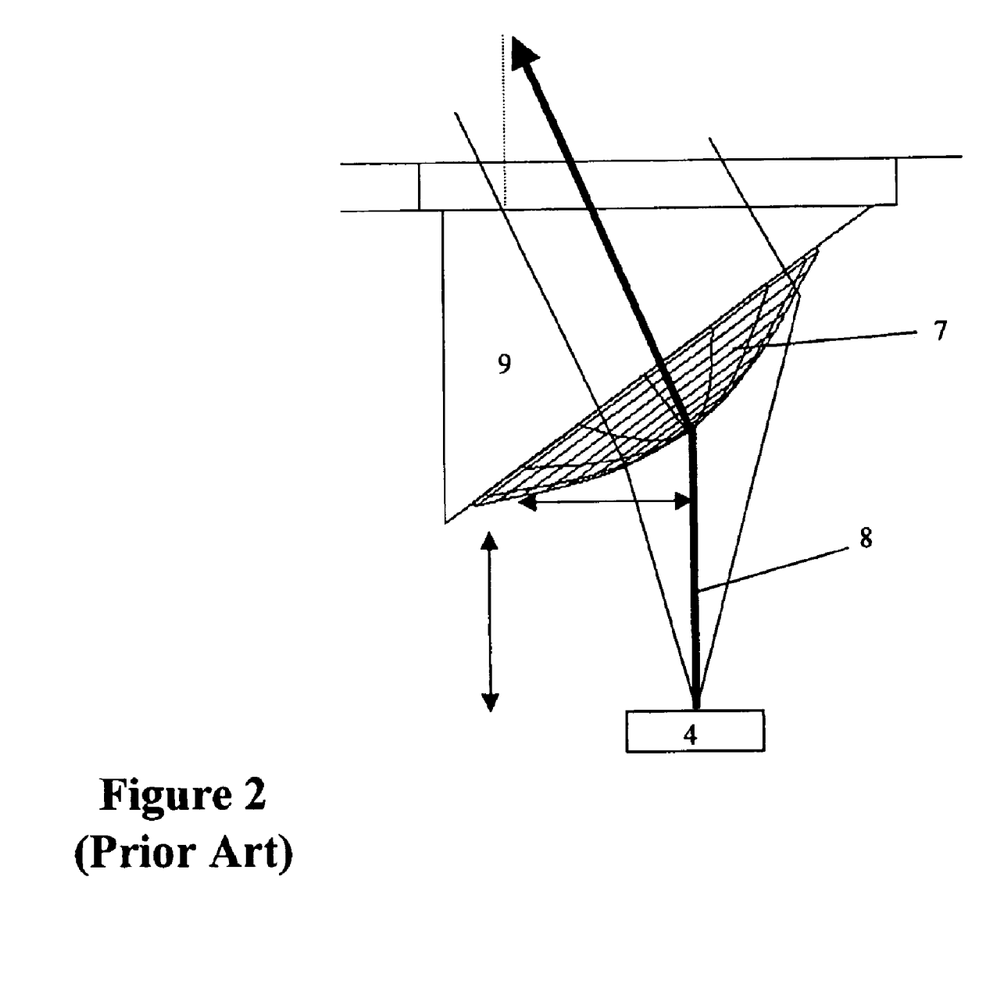
FIG. 2 illustrates a prior design intended to collimate light from a point source, such as an optical fiber.

An additional problem is depicted in FIG. 2, which shows that a collimating element of related design consists of a lens surface positioned on a tilted base of refractive material. The diagram suggests that, by design, the chief optical ray of a beam 8 from a point source 4 strikes the surface of a lens 7 near its center and refracts into the refractive material 9 at an angle equal to the tilt angle of the base on which the lens surface is mounted. The tilt angle of the base is used to redirect the chief ray of the beam 8 to the desired angle, while the curvature of the lens 7 is used to collimate the beam 8. Because the chief ray is deliberately designed to penetrate the surface of the lens 7 off its axis of symmetry, the quality of beam collimation is sacrificed. It is impossible to eliminate aberration in the beam 8 even if aspheric terms are added to the sag equation defining the lens 7. Aberration is especially great for sources of large numerical aperture, for large tilt angles, and for sources displaced slightly from the optimal position. Therefore, there is a need for a system and method that collimates and redirects beams in a fiber optic system in a more efficient manner.

BRIEF DESCRIPTION OF THE DRAWINGS

The accompanying drawings, which are incorporated in and form a part of this specification, illustrate embodiments of the present invention and, together with the description, serve to explain the principles of the present invention.

DETAILED DESCRIPTION

Reference will now be made in detail to the preferred embodiments of the invention, examples of which are illustrated in the accompanying drawings. While the present invention will be described in conjunction with the preferred embodiments, it will be understood that they are not intended to limit the invention to these embodiments. On the contrary, the present invention is intended to cover alternatives, modifications and equivalents, which may be included within the spirit and scope of the invention as defined by the appended claims. Moreover, in the following detailed description of the present invention, numerous specific details are set forth in order to provide a thorough understanding of the present invention. However, the invention may be practiced without these specific details. In other instances, well-known methods, procedures, and components have not been described in detail as not to unnecessarily obscure aspects of the present invention.

Embodiments of the present invention are directed to addressing the aforementioned drawbacks associated with collimating and redirecting beams in a fiber optic system. An embodiment of the present invention is directed to a fiber collimator for redirecting and collimating a light beam from an optical source input. The fiber collimator comprises a prism with a triangular wedge element having a first surface, a second surface and a base, a ferrule to guide the optical source input so as to contact the optical source input with the first surface of the prism, and an aspheric lens integrated on the second surface. The integrated aspheric lens is positioned so that a chief ray of the light beam passes directly through the axis of the aspheric lens. The prism serves to redirect the beam at an angle relative to an axis of the optical source input, with the base of the triangle wedge element redirecting the light beam by total internal reflection (TIR). The aspheric lens then serves to collimate the redirected light beam.

In one embodiment, the present invention is further directed to a fiber coupler for redirecting and coupling a light beam into an optical fiber core of an optical fiber. The fiber coupler comprises a prism, an aspheric lens and a ferrule similar to those in the fiber collimator. The aspheric lens receives a light beam, and is positioned so that the light beam is focused after passing through the aspheric lens, creating a focal spot image. The base of the triangle wedge element of the prism serves to redirect the focused light beam by total internal reflection (TIR) at an angle relative to an axis of the optical fiber, the focused light beam becoming coupled into the optical fiber core. The ferrule guides the optical fiber so as to contact the optical fiber core with the first surface of the prism at or near the location of the focal spot image.

Embodiments of the invention are also directed to a collimating optical subassembly and a focusing optical subassembly. Both are fabricated of optically transparent material and integrated as a single part using injection-molding techniques. The former is for collimating and redirecting a divergent light beam from a point source; it comprises an aspheric lens, a spacer element and a wedge element. The aspheric lens receives and collimates a divergent light beam, creating a collimated light beam. The spacer element is positioned above the aspheric lens, and the wedge element is positioned above the spacer element. The wedge element refracts the collimated light beam into air at an angle relative to the axis of the aspheric lens consistent with Snell's law. On the other hand, the focusing optical subassembly is for redirecting and focusing a collimated light beam. The focusing optical subassembly comprises a wedge element, a spacer element and an aspheric lens. The wedge element receives a collimated light beam from outside. The spacer element is positioned below the wedge element, and the aspheric lens is positioned below the spacer element. The collimated light beam received by the wedge element travels in air at an angle relative to an axis of the aspheric lens. The wedge element redirects a chief ray of the collimated beam through the spacer element along the axis of the aspheric lens. The aspheric lens focuses the collimated light beam to a point along its axis.

Another embodiment of the present invention is directed to a transceiver comprising alignment ferrules for optical fibers, a fiber connector housing, and a ledge to precisely control the planar orientation of a printed circuit board. Using a combination of aspheric lenses and prisms, and in particular, the fiber coupler, the fiber collimator, the collimating optical subassembly and the focusing optical subassembly, the transceiver is able to collimate and route light from two or more VCSELs or edge-emitting lasers through a "zig-zag" configuration as well as to redirect and focus the combined light onto the core of a single optical fiber. Moreover, collimating and routing light from a single optical fiber, having multiple wavelength components, through a free-space "zig-zag" configuration and redirecting and focusing the light at each individual wavelength onto a different photodetector are achieved.

The WDM transceiver module described herein is paraxial by design, using aspheric lenses to compensate for spherical aberration, and optically optimized for alignment tolerances of the laser sources and photodetectors. This is done by adjusting the optical focal lengths of the lenses to magnify or de-magnify the image of the laser source (transmitter) or fiber core (receiver) on the respective image plane. Appropriate magnification may be used to increase the tolerance of the optical system to misalignment of the laser sources and/or photodetectors, and/or to match the numerical aperture of the laser source to that of the optical fiber into which the light is coupled. This optimization maximizes the overall alignment tolerance of the optical subassembly with the substrate on which the lasers and photodetectors are attached, and/or the coupling efficiency of the lasers to the optical fiber. This optimization technique, the specific layout of fiber ferrules, prisms and lenses integrated as one part with the ledge to aid in positioning on a printed circuit board are enabling features for mass production of low-cost WDM transceivers using current state-of-the-art optical-quality injection molding techniques.

According to a further embodiment of the present invention, a mold assembly for fabricating an integrated optical assembly as a single injection-molded part is provided. The mold assembly comprises first and second mold halves and a single slider. The first and second mold halves are arranged to mate with each other, forming a draw direction oriented parallel to axes of aspheric lenses of a focusing optical subassembly of an optical de-multiplexer and a collimating optical subassembly of an optical multiplexer. The single slider is used to form ferrules for a fiber collimator of the optical de-multiplexer and a fiber coupler of the optical multiplexer as well as to form the connector housing. The first mold half is used to shape wedges of the collimating and focusing optical subassemblies and to shape aspheric lenses of the fiber collimator and the fiber coupler. The second mold half is used to shape total internal reflection surfaces of the fiber collimator and the fiber coupler and to shape the aspheric lenses of the collimating and focusing subassemblies.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

Embodiments of the present invention are directed to systems and methods for collimating and redirecting beams in an optical system. In general, the present invention is applicable whenever light from a point source—e.g., laser, optical fiber—needs to be collimated, directed off-axis, and refocused to form an image of the source with good quality and carefully controlled position, size and numerical aperture. The present invention is also applicable when the alignment tolerance of the source and the image relative to the optical system needs to be optimized. For example, embodiments of the present invention are utilized in a wavelength division multiplexing (WDM) system to multiplex and de-multiplex several wavelengths/channels of light, wherein WDM transceiver modules are optically optimized for the alignment tolerance of the laser sources and photodetectors. The optimization maximizes the overall alignment tolerance of the optical subassembly with the substrate on which the lasers and photodetectors are attached. This technique, along with the specific layout of prisms and lenses, are enabling features for mass production of optical subassemblies and free-space coupled WDM transceiver modules.

Figure 3A:
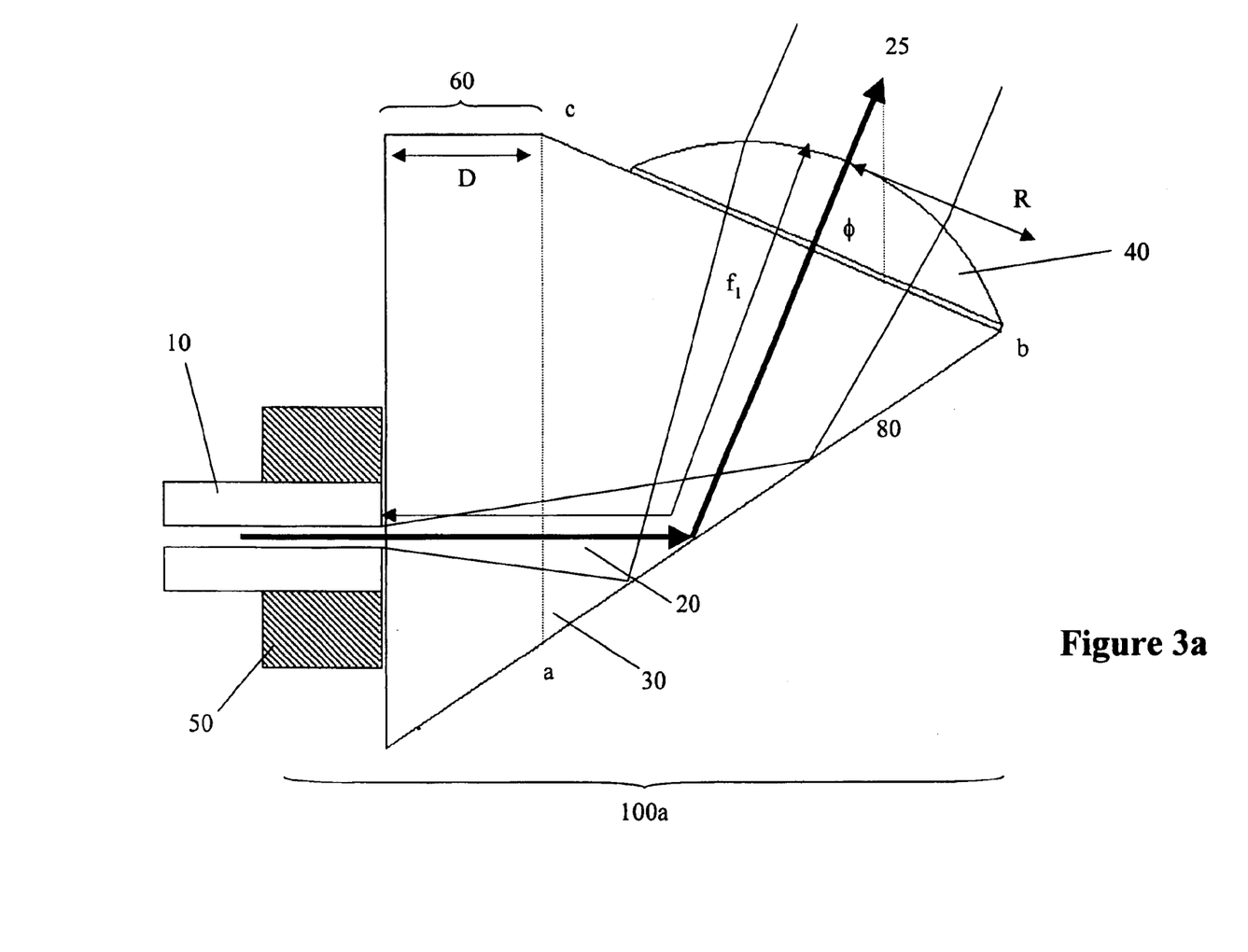
FIG. 3a shows an optical subassembly for redirecting and collimating output from an optical fiber according to an embodiment of the present invention.

With reference now to FIG. 3a, an optical subassembly 100a according to an embodiment of the present invention is provided. In the embodiment, the optical subassembly 100a is a fiber collimator that is designed to redirect and collimate an output of a divergent light beam 20 from an optical fiber 10, creating a collimated output 25. The optical subassembly 100a comprises a prism 30, an aspheric lens 40 and an alignment ferrule 50. The optical fiber 10 directs the divergent light beam 20 into the optical subassembly. Prior to collimation, the prism 30, having an index of refraction n, is used to redirect the divergent light beam 20 at a specific angle (ϕ) relative to the axis normal to the incoming optical axis using total internal reflection (TIR). TIR results as divergent light beam 20 hits a TIR surface 80 of the prism 30. In one implementation, the angle ϕ must satisfy the following condition:

$$2 \arcsin(1/n) - \pi/2 < \phi < \pi/2$$

The prism 30 may, for example, be made of polycarbonate because of its highly transparent characteristic, with the index of refraction n being approximately 1.57. If this case, the angle ϕ must be greater than −10.87 degrees.

As shown in FIG. 3a, the prism 30 has a spacer element 60, having a length D. The length D of the spacer is defined in such a way that the folded optical path of light passing through the aspheric lens 40 places the focus of the lens 40 at or near the input wall of the prism 30. The spacer element 60 is an important feature to the design of the optical subassembly 100a, enabling convenient tuning of the focal length and numerical aperture in this portion of an optical system while maintaining a well-defined focal plane, which is important for alignment purposes. However, it should be apparent to one in the art that depending on the specific arrangement of the optical fiber 10 and the structures of optical subassemblies in accordance with other embodiments of the present invention, the spacer element 60 may not be needed.

According to an embodiment of the present invention, the alignment ferrule 50 is attached to the prism 30 to ensure that the optical fiber 10 is optimally aligned to the prism 30. As shown in FIG. 3a, this alignment is defined by having the chief ray from the fiber propagate directly along the axis of symmetry of the lens 40. In one embodiment, this is ensured by the geometry of the prism 30, designed such that an isosceles triangle ("abc") wedge is provided. Here, the isosceles triangle abc is symmetric about the vertex "c", i.e., the length of side ca is equal to the length of side cb. The isosceles triangle abc wedge is provided to ensure that the chief ray enters and exits the optical subassembly 100a at a normal incidence. This preserves the independence of the angles of the isosceles triangle abc on the choice of refractive material used to construct the optical subassembly. Used in conjunction with the spacer element 60, the isosceles triangle abc wedge can be kept at a constant dimension, while the spacer element 60 provides a means for adjusting the optical path length from the optical fiber 10 to the aspheric lens 40. This allows the focal length of the lens 40, and thereby the radius of the collimated beam 25, to be adjusted while keeping the dimensions of the isosceles triangle abc wedge constant. In other embodiments, other types of triangular shaped wedge may be used.

In one implementation, the optical subassembly 100a, consisting of the alignment ferrule 50, the prism 30 and the aspheric lens 40, is manufactured as one part, thereby minimizing alignment inaccuracy. The prism 30, the aspheric lens 40 and the alignment ferrule 50 may be made by a standard injection molding process using, for example, polycarbonate, polyolefin, or polyethylimide. On one hand, polycarbonate is often used because of its high transparency. On the other hand, polyethylimide is often used because of its high temperature operating characteristic and low coefficient of thermal expansion (CTE).

Figure 3B:
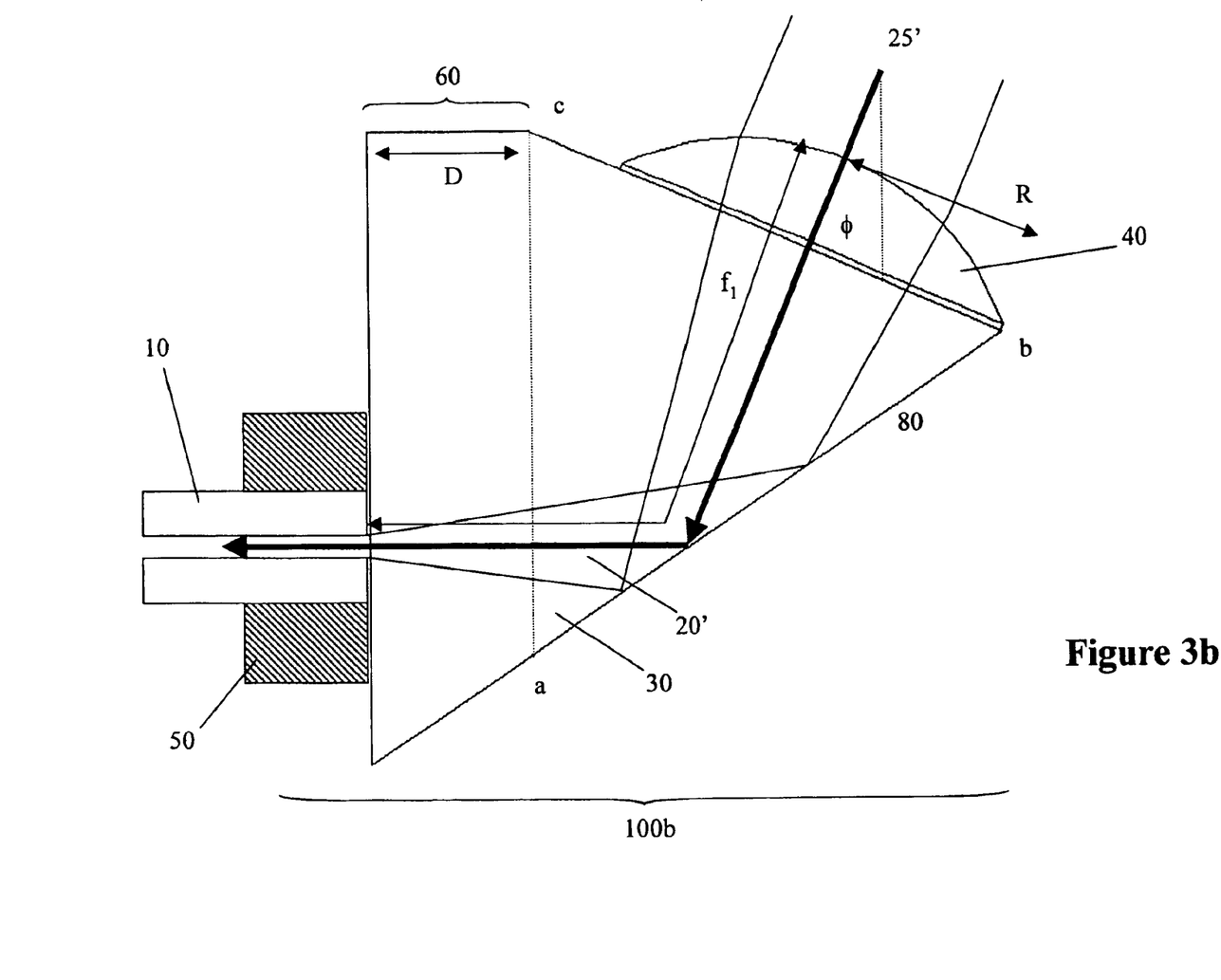
FIG. 3b shows an optical subassembly for redirecting and coupling a collimated beam into an optical fiber according to an embodiment of the present invention.

The optical subassembly described above can naturally be operated in reverse to redirect and focus a collimated beam into an optical fiber. FIG. 3b illustrates an optical subassembly 100b for redirecting and coupling collimated beam into an optical fiber according to an embodiment of the present invention. In the embodiment, the optical subassembly 100b is a fiber coupler created for redirecting and focusing a collimated beam 25' whose chief ray enters along the axis of symmetry of an aspheric lens 40. The focal length of the lens 40 is designed to produce an image spot with a numerical aperture matching the numerical aperture of an optical fiber 10. The prism 30 is utilized to redirect a convergent light beam 20', which is formed from the collimated beam 25' passing through the aspheric lens 40 and redirected by a TIR surface 80. An alignment ferrule 50 and a spacer element 60 are used to precisely position the optical fiber 10 at the focus of the optical subassembly 100b.

Figure 4A:
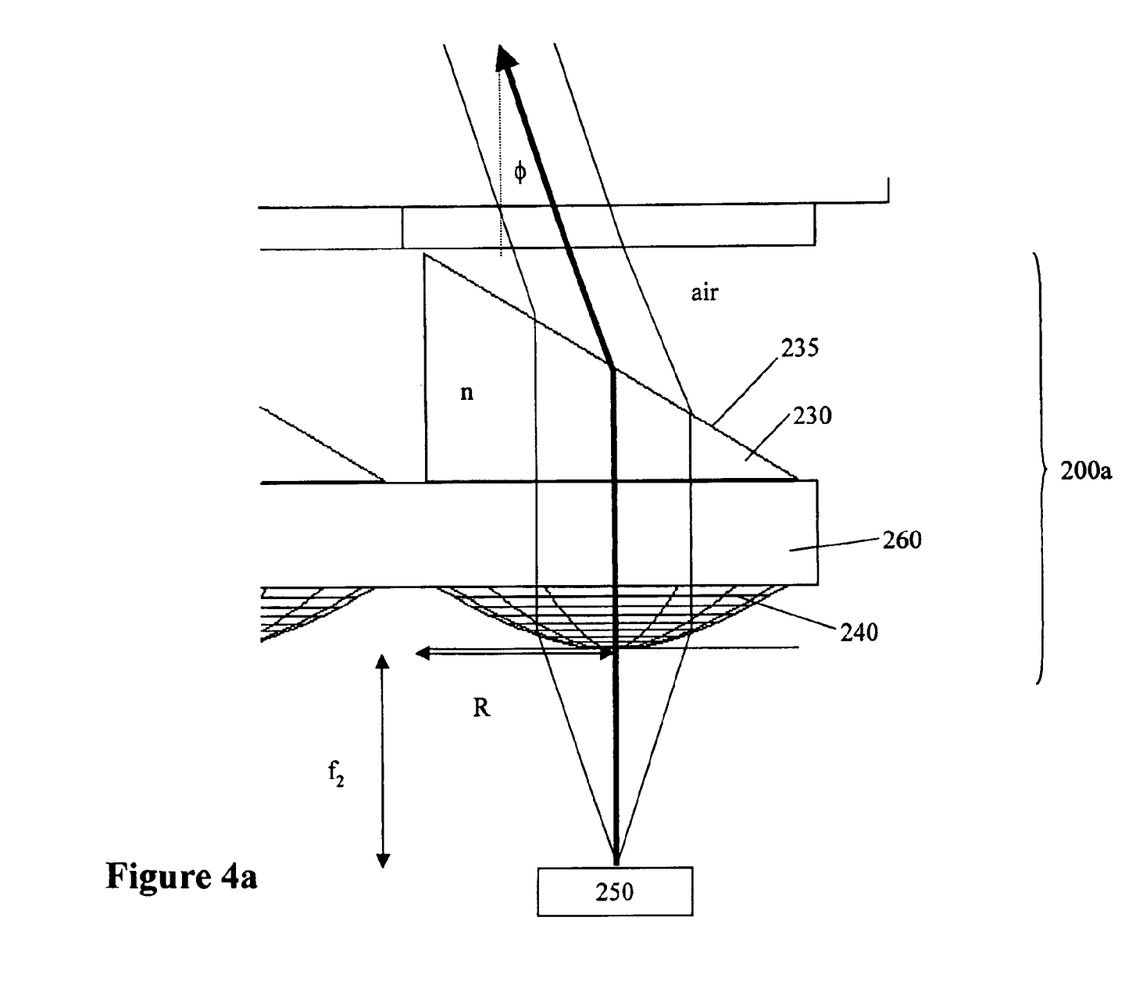
FIG. 4a shows an optical subassembly for collimating and redirecting an output beam from a surface emitting laser according to an embodiment of the present invention.

FIG. 4a illustrates an optical subassembly 200a for collimating and redirecting an output beam from a surface emitting laser according to an embodiment of the present invention. The optical subassembly 200a comprises a prism 230, an aspheric lens 240, and a spacer 260 positioned in between the prism 230 and the aspheric lens 240. In one embodiment, the optical subassembly 200a is used for collimating and redirecting an output beam from a vertical cavity surface-emitting laser (VCSEL) 250. Examples of the laser sources of interest for this application includes, but are not limited to, VCSELs emitting in the 850 nm band, VCSELs emitting in the 980 nm band, and VCSELs currently in development at the 1300 nm band. In contrast to the prior art design shown in FIG. 2, a non-tilt aspheric lens 240 is used to collimate the output beam from the VCSEL 250, while a flat, tilted surface 235 of the prism 230 is used to redirect the collimated beam to a desired angle. This effectively uncouples the two separate tasks of redirection and collimating in the present design, making the design "paraxial," i.e., the beam falls on the refracting surface close to and almost parallel to the axis. The absence of tilt in the aspheric lens 240 and the addition of a second, flat surface 235 to perform the function of redirecting the beam are key differences between the present invention and prior designs. This significantly improves the collimated beam quality, enabling the output beam to remain well collimated even for a source having a large divergence angle and/or significant offsets in the position of the source. The result is a greatly improved tolerance to misalignment.

Figure 4B:
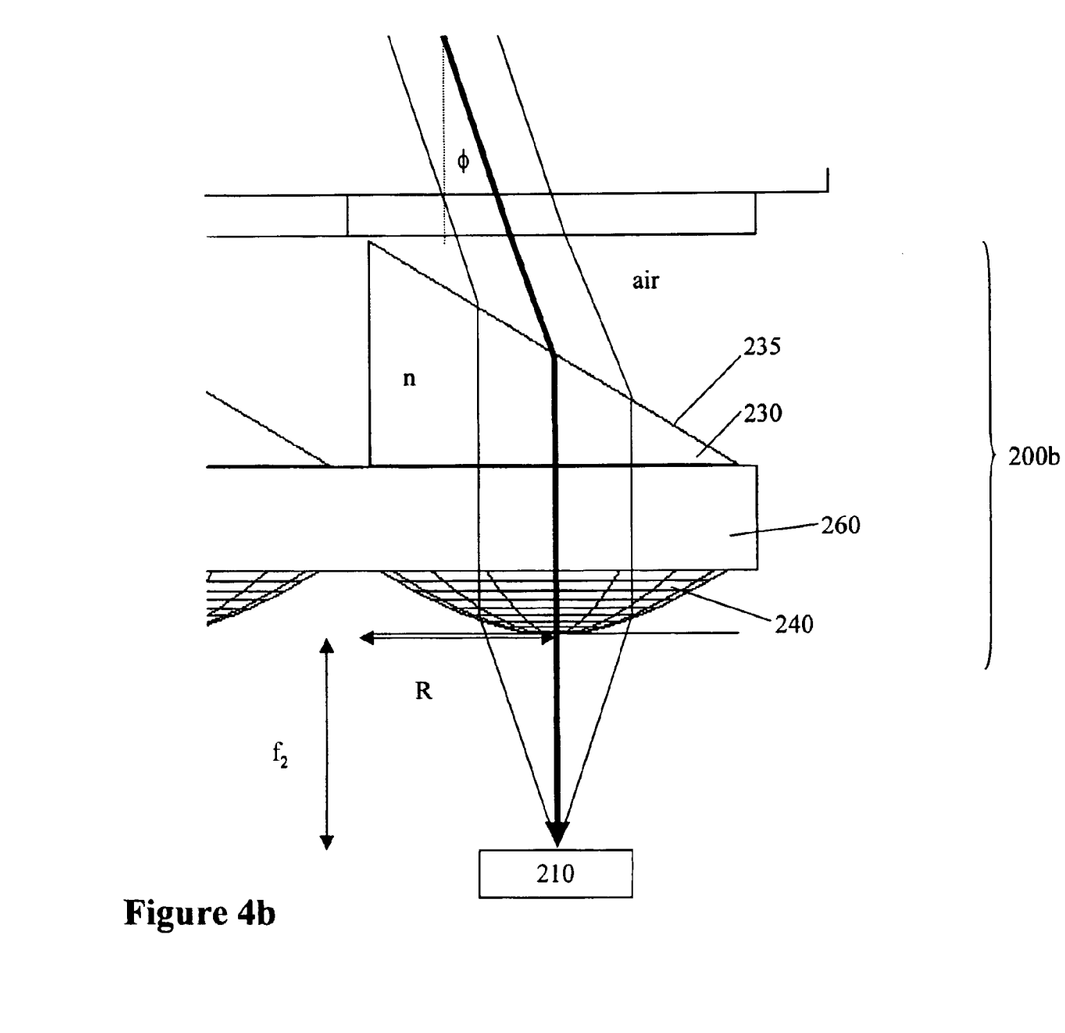
FIG. 4b shows an optical subassembly for redirecting and coupling a collimated beam into a photodetector according to an embodiment of the present invention.

Like the optical subassembly 100a described in FIG. 3a, the optical subassembly 200a shown in FIG. 4a, can be used in reverse to redirect and focus a collimated beam. FIG. 4b illustrates an example of such an optical subassembly 200b. A collimated beam is incident to a flat, tilted surface 235 of the prism 230 at a specific angle. The optical subassembly 200b, being paraxial in nature, makes use of the flat, tilted surface 235 to redirect the collimated beam and an aspheric lens 240 to focus the beam. This results in a diffraction-limited image being focused onto a photodetector 210. Since photodetectors utilized for high-speed optical modulation typically have small active area, efforts to minimize the size of the image are important to maximize both the optical energy detected and the tolerance to detector misalignment. With the paraxial optical subassembly 200b, the size of the image is minimized at the photodetector 210. Typically, a spacer 260 is provided between the aspheric lens 240 and the prism 230. One of the functions of the spacer 260 is to allow molten optically transparent material to easily flow through a mold for fabricating the optical subassembly 200a and/or the optical subassembly 200b during injection molding manufacturing processes.

Figure 5A:
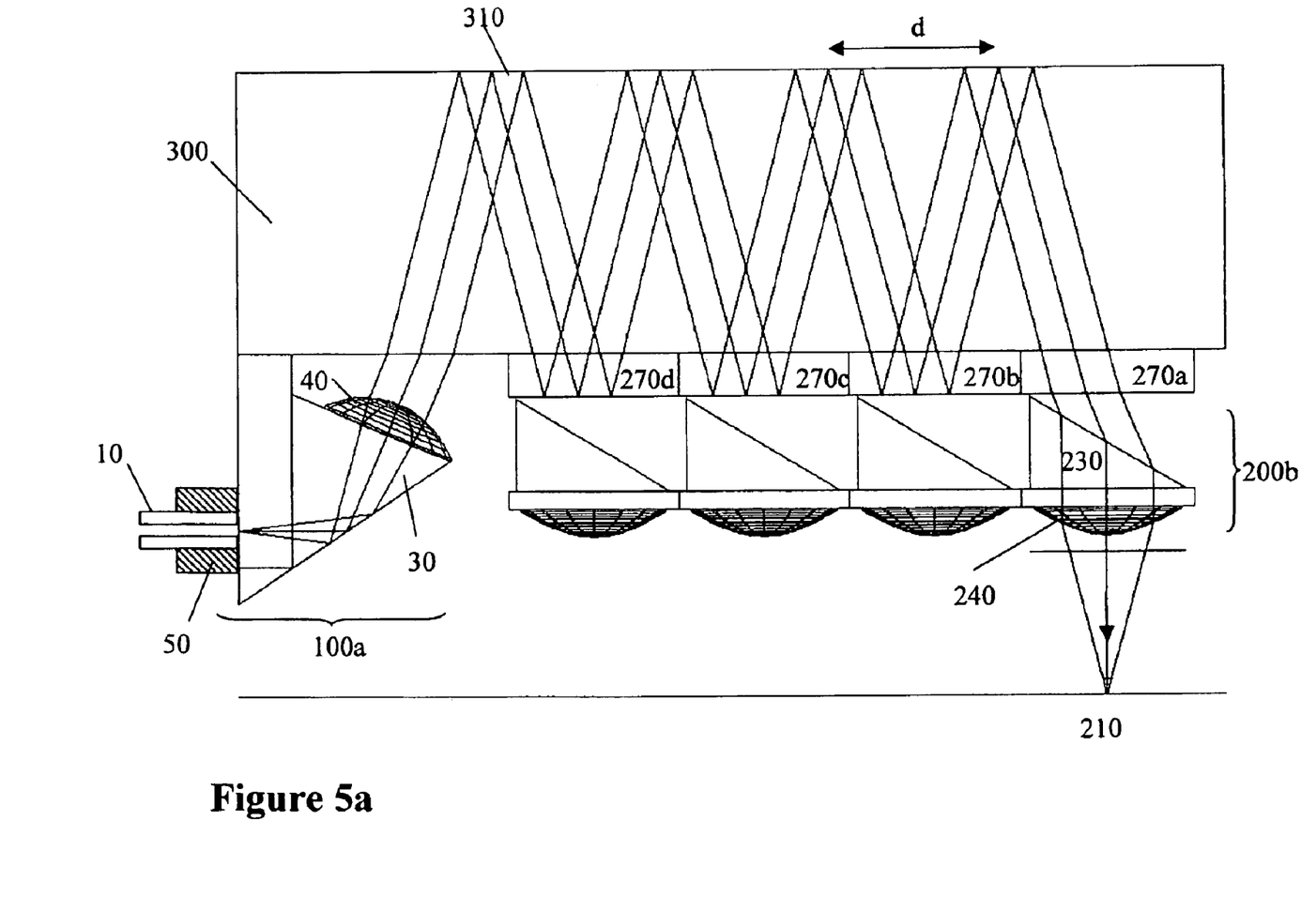
FIGS. 5a and 5b illustrate schematically designs for a four-channel wavelength division multiplexer/de-multiplexer with a fiber optic input/output according to an embodiment of the present invention.
Figure 5B:
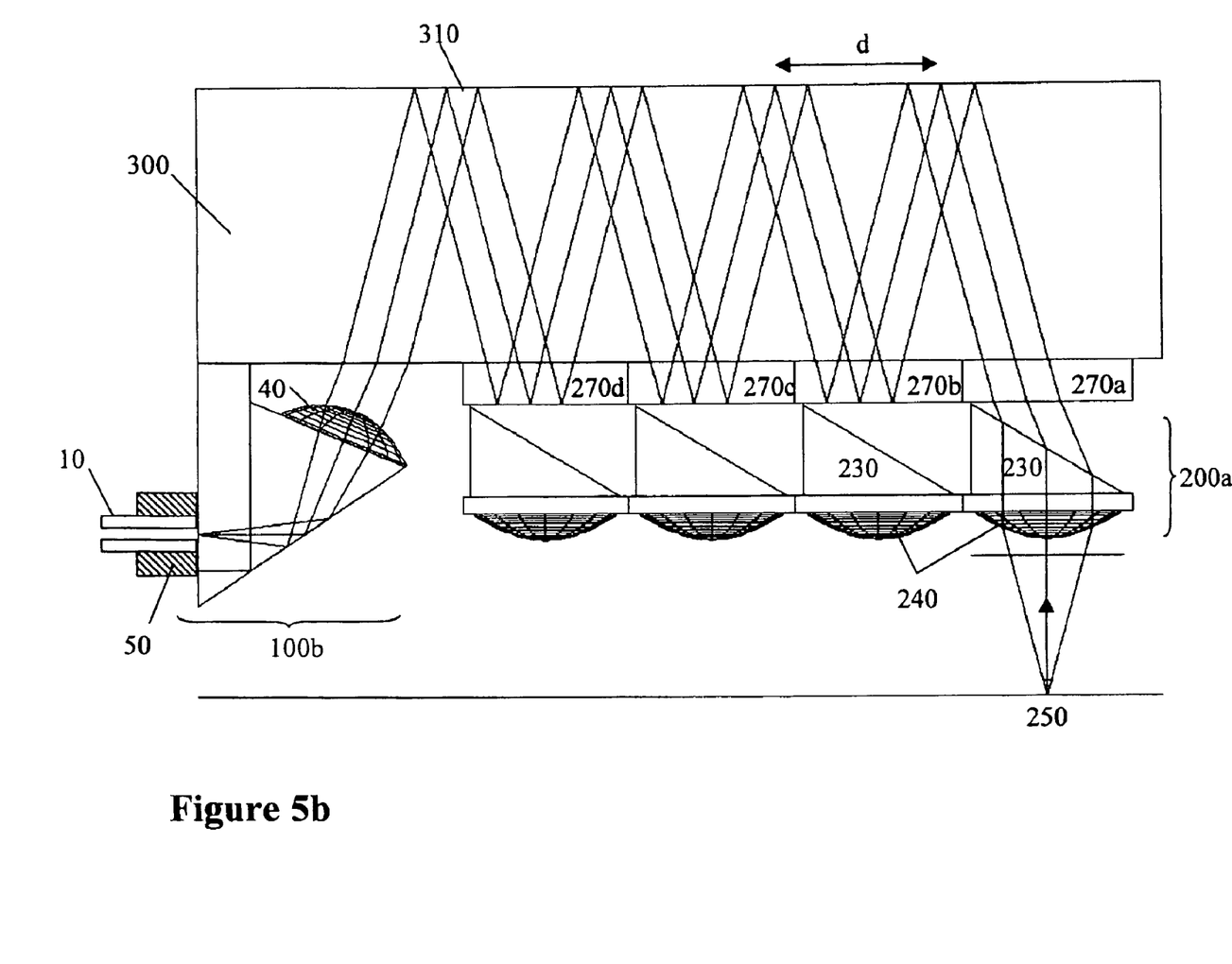

FIG. 5a and FIG. 5b illustrate schematically designs for a four-channel wavelength division multiplexer/de-multiplexer with a fiber optic input/out according to embodiments of the present invention. The four-channel wavelength division multiplexer/de-multiplexer uses thin film filters (TFFs) in a "zig-zag" scheme to perform channel separation. FIG. 5a depicts an optical demultiplexer, or a receiver, that consists an optical subassembly 100a as depicted in FIG. 3a, a glass plate 300, a set of TFFs 270a–270d and a set of focusing optical subassemblies 200b as depicted FIG. 4b. With the prism 30 and aspheric lens 40, the optical subassembly 100a, or the fiber collimator, redirects and collimates a divergent beam from an optical fiber 10 at a specific angle relative to normal to the input axis of the optical fiber 10. In the embodiment, the light beam contains multiple wavelengths, and four focusing optical subassemblies 200b and four TTFs 270a–270d are provided. From the optical subassembly 100a, the collimated, multi-chromatic beam refracts into the glass plate 300, which has a high refractive (HR) coated surface 310 for reflecting the beam. The HR coated surface 310 is coated with a broadband high reflective (HR) coating, and it is coated on the side opposite to the side from with the beam enters. The bandwidth of the HR coating includes all the wavelengths to be de-multiplexed. The input angle of the collimated beam is controlled to allow the collimated beam to reflect back-and-forth within the glass plate 300 with a specific spacing d. This is determined by the angle of a TIR surface of the prism 30, the refractive index of the glass plate 300, the refractive index of the TFF substrates 270a–270d, and the thickness of both the glass plate 300 and the TFF substrates 270a–270d.

In the embodiment, each of four TFFs 270a–270d is highly reflective over the same bandwidth as the above-described HR coating surface 310 on the glass plate 300, except within a narrow passband centered at one of the four wavelengths that comprise the input beam. The passband of the TFFs 270a–270d should be wide enough to allow for laser wavelength drift with temperature, manufacturing error, etc. The center wavelengths should be spaced sufficiently far apart, so that negligible overlap exists among the passbands of the TFFs 270a–270d. The width of each of the TFFs 270a–270d used in the embodiment of the present invention shown in FIGS. 5a and 5b may, for example, be 10–15 nm and the spacing may, for example, be 20–25 nm. Further, the design of the multi-layer dielectric structure, used to construct passbands of the TFFs 270a–270d employed in the embodiment, is optimized for the specific angle of incidence expected for the "zig-zag" scheme. This optimization minimizes any variation in reflection and transmission due to the polarization state of the incident light.

In one embodiment, the TFFs 270a–270d are course wavelength division multiplexing (CWDM) filters, or so-called wide wavelength division multiplexing (WWDM) filters, that are used in a CWDM system. In other embodiments, the TFFs 270a–270d are dense wavelength division multiplexing (DWDM) filters, that are used in a DWDM system, where light at different wavelengths is closely packed. In one implementation, the substrate of each TFFs 270a–270d is composed of the same refractive material as the glass plate 300. In other implementations, the TFFs 270a–270d and the glass plate 300 have different refractive indexes. In FIGS. 5a and 5b, each of the TFFs 270a–270d is positioned such that its bandpass coating faces away from the glass plate 300. However, the bandpass coating may be placed in contact with the glass plate 300 in other embodiments. In one implementation, an index matching epoxy may be used to attach the set of TFF substrates 270a–270d to the glass plate 300.

In operation, a wavelength component of the collimated beam is shown to propagate back-and-forth within the glass plate 300 of the optical demultiplexer of FIG. 5a. The propagation ends when the collimated beam is incident onto a particular TFF with a bandpass coating that allows the particular wavelength component to pass. As illustrated in FIG. 5a, the TTF 270a is the particular TTF for a particular wavelength component. After passing through TFF 270a, the wavelength component passes through a focusing optical subassembly and is focused onto a photodetector 210. The photodetector 210 may, for example, be a photodiode.

Although not shown for sack of clarity, each of the other wavelength components (not shown) in the input beam passes through a different TFF and is directed and focused onto a different photodetector (not shown). Preferably, a photodetector is positioned beneath each aspheric lens 240 to detect the wavelength component passing therethrough.

FIG. 5b depicts a four-channel wavelength optical multiplexer according to an embodiment of the present invention. Light from any one of VCSELs 250 is first collimated, then redirected into a "zig-zag" optical path, and finally coupled into an optical fiber 10. The VCSELs 250 are mounted on a line below the multiplexer. Use of several VCSELs and TFFs having non-overlapping passbands, each centered at the emitting wavelength of its corresponding VCSEL, enables the design of a wavelength division optical multiplexer (WDM). One VCSEL is positioned beneath each aspheric lens to introduce its light beam into the WDM system. For sack of clarity, only one light beam and one VCSEL are shown. The light beam emitted from a VCSEL 250 passes through its corresponding optical assemblies 200a, like the one described in FIG. 4a. The light is collimated by the aspheric lens 240 and redirected by the prism 230 into the glass plate 300. Upon entering the glass plate 300, the light beam passes through the TFF 270a. Light beams from other VCSELs enter the glass plate 300 in a similar fashion. Since the TFFs 270a–270d have non-overlapping passbands, different wavelength components are extracted from the light beams. Inside the glass plate 300, light with different wavelength components travels in a "zig-zag" optical path while being reflected by the HR coating 310 and the TFFs 270a–270d. After leaving the glass plate 300, the light with different wavelength components are coupled into an optical fiber 10 by an optical subassembly 100b, like the one described in FIG. 3b.

Of importance to the transceiver design depicted in FIG. 5a and FIG. 5b is the alignment of the VCSELs 250 and photodetector apertures 210 to their corresponding aspheric lenses 240. Misalignment often results because of the manufacturing tolerances of optical subassemblies and/or glass plates, thermal expansion, placement accuracy of a die bonder used to position the VCSEL 250 and photodetector 240, etc. Efforts to maximize the amount of light coupled into the optical fiber 10 despite any misalignment of the VCSEL 250, and/or to maximize the amount of light incident onto the photodetector 210 despite any misalignment of the photodetector 210, are necessary to make the transceiver design more readily manufactured. In the present invention, several design features are specifically utilized for this purpose. For example, to ensure an optimally collimated beam, despite small variation in the position of the VCSEL 250 in FIG. 4a, the aperture of the aspheric lens 240 is made larger than the waist of the output beam, that is $$R > f_2 \tan(\sin^{-1}(NA/n)),$$

where R is the aperture of the aspheric lens 240 and $f_2$ is the focal length of the aspheric lens 240. The lens parameters for the aspheric lens 40 in FIG. 3b are optimized by assuming a source with a numerical aperture (NA) that completely fills the full aperture of the lens, given by the following expression:

$$NA = n \sin(\tan^{-1}(R/f_1)).$$

This ensures that the image of the source remains undistorted even if the source is displaced from its optimal position. When the VCSEL 250 is displaced, the undistorted, diffraction-limited image, whose size is proportional to the size of the source, simply translates in the image plane an amount proportional to the displacement of the source. The constant of proportionality for both size and displacement is the magnification of the entire optical system, given by the ratio of the focal length $f_1$ of the optical subassembly 100b and the focal length $f_2$ of the optical subassembly 200a. Similar arrangements and analysis apply to optical subassemblies depicted in FIGS. 4b and 3a. If the focal length of the aspheric lens 40 and the aspheric lens 240 are equal, for example, the laser source from the VCSEL 250 is imaged at actual size onto the fiber core of the transmitter fiber 10, and the fiber core of the receiver is imaged at actual size onto the photodetector 210. The image in each case moves one micron for every micron of source displacement.

Figure 6:
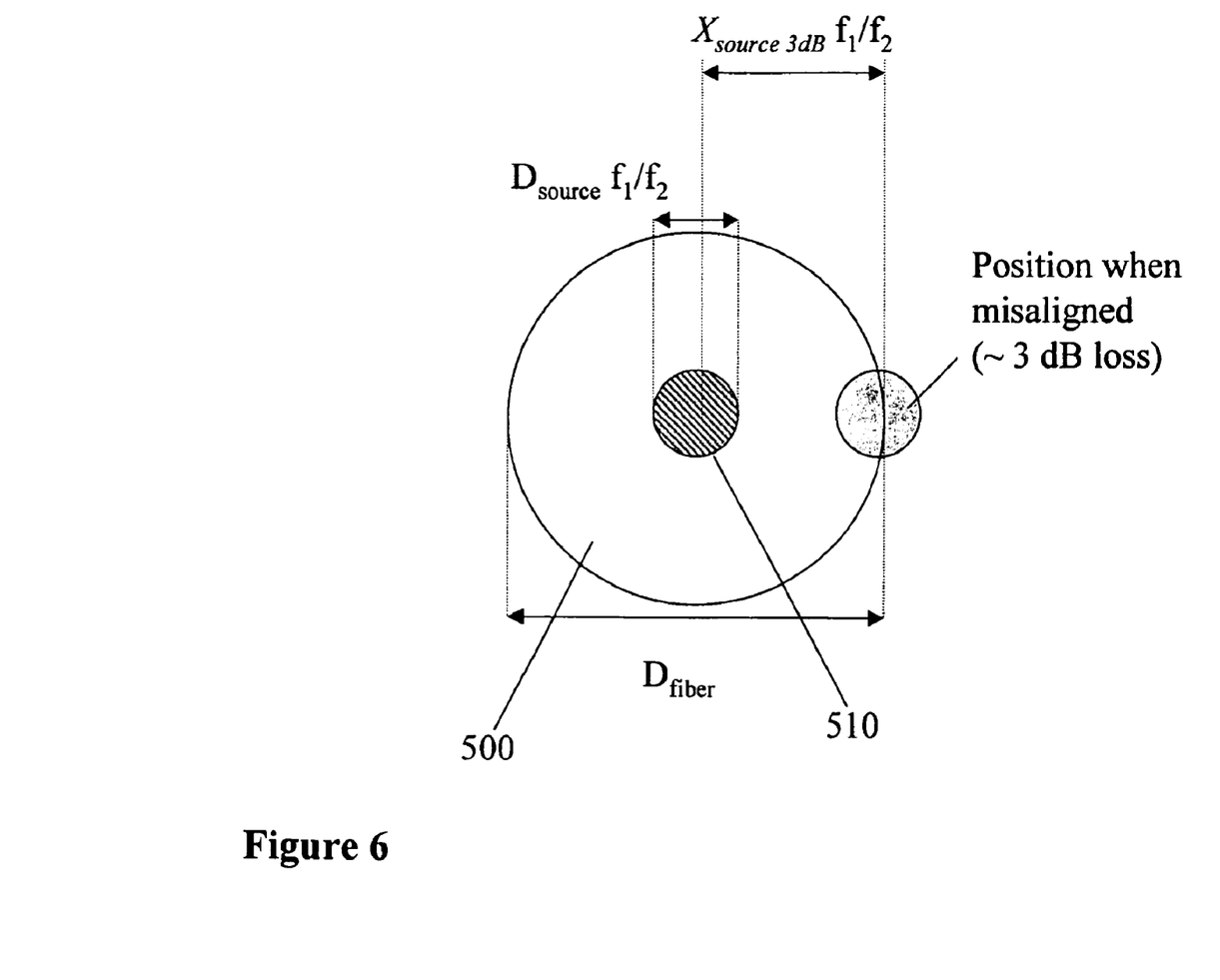
FIG. 6 shows a case where the magnification of an optical system is not equal to one according to an embodiment of the present invention.

FIG. 6 shows a general case, where the magnification of the optical system is not equal to one, i.e., the laser source or the fiber core is not imaged at actual size. If the VCSEL 250, or the laser source, is displaced from its ideal position by a distance $X_{source}$, then the image 510 of the VCSEL aperture on the fiber core 500 moves a distance $X_{source} f_1/f_2$. Approximately half the power (i.e. 3 dB) is lost in the transmitter when $X_{source} f_1/f_2 = D_{fiber}/2$, where $D_{fiber}$ is the diameter of the optical fiber. The alignment tolerance for placing the laser source is, therefore, $X_{source\ 3\ dB} = D_{fiber} f_2 / 2 f_1$. It would be desirable to minimize the magnification in order to maximize the alignment tolerance; however, the choice of magnification also impacts the numerical aperture (NA) of the source image projected onto the fiber core. It is undesirable to project an image to the fiber core with a NA larger than that of the fiber because light will be lost. The NA, $NA_{source}$, of the source image and the NA, $NA_{fiber}$, of the image projected onto the fiber core are related through the following expression:

$$NA_{fiber} = NA_{source} f_2 / f_1$$

Because of this, the minimum desirable magnification is given by $$f_1/f_2 = NA_{source}/NA_{fiber}.$$

The alignment tolerance of the source in this case becomes $X_{source\ 3dB} = D_{fiber} NA_{fiber}/2NA_{source}$. In one implementation of the present invention, this constraint is used when designing the prescription for the lens 40 in the optical subassembly 100b used to couple collimated light into the optical fiber 10 and the lens 240 in the optical subassembly 200a used to collimate the light from the VCSEL 250. For example, a typical 50 micron diameter multimode fiber having a NA near 0.2, and a typical VCSEL, having a NA near 0.26, suggests a magnification near 1.3. This translates into an alignment tolerance of ±20 microns for the VCSEL 250.

Figures 7A, 7B:
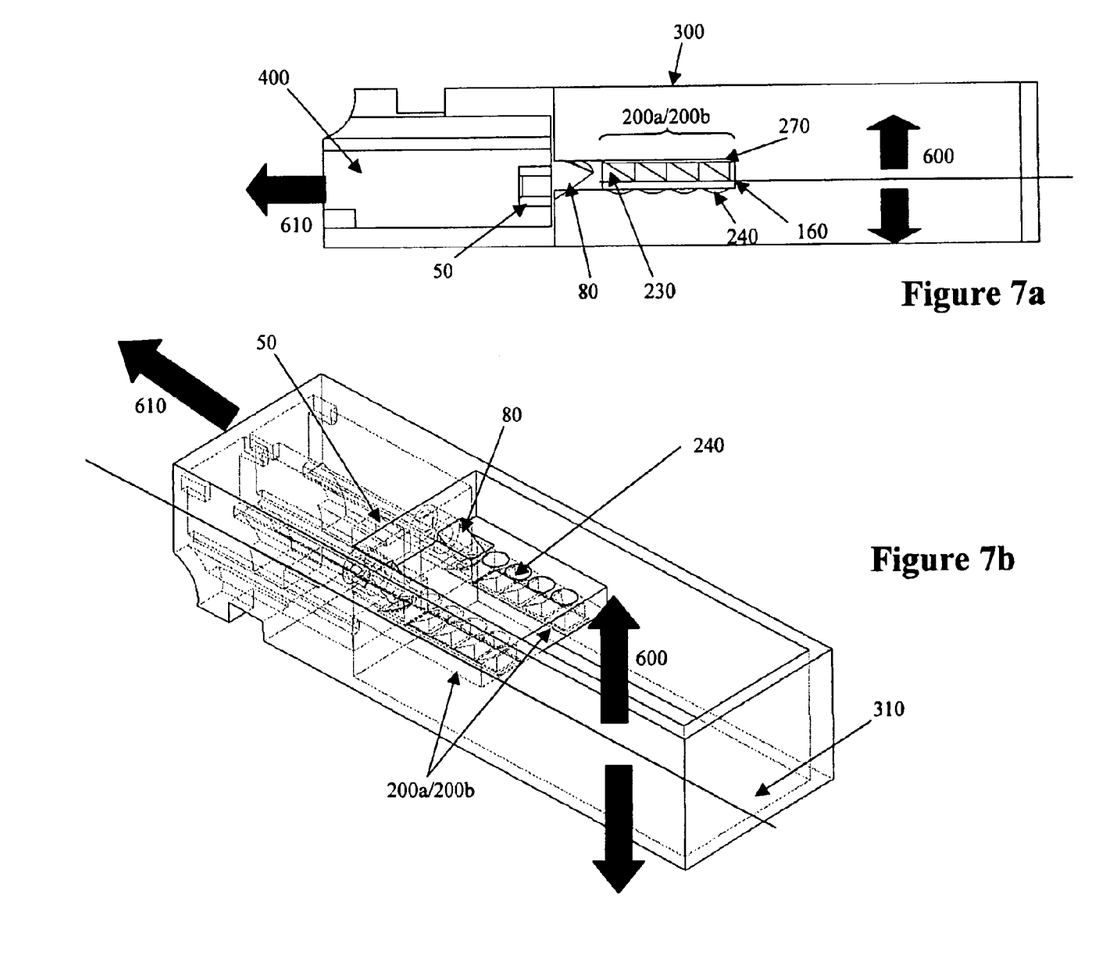
FIGS. 7a and 7b show a four channel CWDM transceiver integrated with a connector housing suitable to receive a fiber optic connector according to an embodiment of the present invention.

FIGS. 7a and 7b show perspective views of a four-wavelength CWDM transceiver integrated with a housing suitable for receiving a duplex fiber optic connector according to an embodiment of the present invention. FIG. 7a is a cross-sectional view of the four-wavelength CWDM transceiver with the housing, and FIG. 7b is a perspective view of the four-wavelength CWDM transceiver with the housing looking from the bottom of the transceiver. The assembly/device shown in FIGS. 7a and 7b consists of at least one of the optical subassemblies 200a, 200b described in FIG. 5a and FIG. 5b, respectively, integrated with a connector housing 400 suitable to receive a duplex fiber connector or any other fiber optic connector. Shown in FIG. 7a are slots used for accurately placing TTFs 270 over the optical subassemblies 200a or 200b. These slots are created at a distance equal to or substantially equal to the TFF substrate thickness. The square cavity directly above the prism/lens components, and above the TFFs 270, is where the HR coated glass plate 300 is positioned. In a preferred implementation, the assembly depicted in FIG. 7a and FIG. 7b is manufactured as a single part, using plastic (e.g. polycarbonate or polyethylimide) injection-molding techniques. In these techniques, plates containing cavities where plastic will ultimately reside are brought together along a "direction of draw," which is designated by reference numeral 600. This forms a closed mold. One or more "sliders," designated by reference numeral 610, manufactured with surface shapes relevant to the plastic part of interest, may be inserted into the closed mold along axes other than that of the draw direction 600. Mold inserts for optical surfaces may be manufactured separately using high precision, diamond-tip machining techniques and inset into the rest of the mold. Once the complete volume is defined, molten plastic is injected through one or more gates, with the) pressure of the plastic displacing the air in the cavity out through one or more vents. Once the plastic part cools, the sliders 610 retract and the plates separate. The part is then ejected and the cycle repeats.

While the design rules for manufacturing molds suitable for plastic injection molding are well known, special care is required to design a single-piece WDM transceiver mold with the optical functionality described in FIG. 5a and/or FIG. 5b. Shown in FIGS. 7a and 7b, the lens and prism surfaces in the preferred implementation of the present invention are easily cast using only the two mold faces that meet along the direction of draw 600. A single "slider" surface is used to cast the inside of the connector housing, including the alignment ferrule 50 used to guide the optical fiber. Diamond-turned inserts are, for example, used to define all optical quality surfaces including the lenses 40, prisms 30, and TIR surfaces 80. In addition, a plastic spacer 260 is, illustratively, placed between the redirecting prisms 230 and the aspheric lenses 240. The spacer 260 is included to provide, as one of its functions, an adequate flow channel for the molten plastic.

Figure 8:
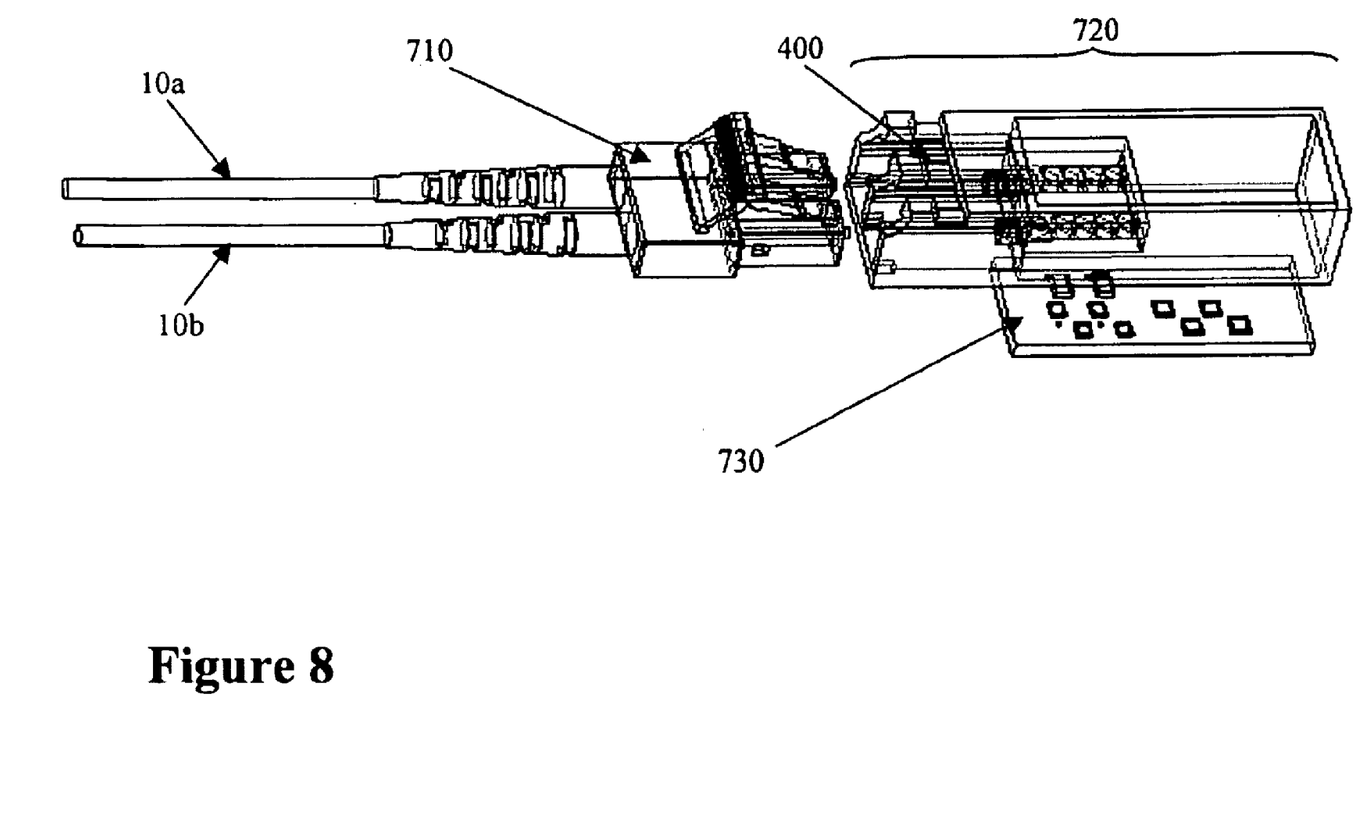
FIG. 8 shows a complete transceiver module in which embodiments of the present invention may function.

FIG. 8 shows a complete transceiver module according to an embodiment of the present invention. The complete transceiver module includes a dual fiber optic connector 710, an injection-molded optical assembly 720, a printed circuit board (PCB) 730, and a metal shield for minimizing electromagnetic interference (not shown). Optical fibers 10a, 10b are connected to the dual fiber connector 710. One optical fiber in the dual connector 710 is for the receiver, and the other one is for the transmitter. As described, the optical assembly 720 is preferably a one-piece injection-molded optical subassembly with a connector housing 400. The dual fiber connector 710 slides into the connector housing 400. The PCB 730 is aligned with the one-piece injection-molded optical subassembly in the optical assembly 720. On the PCB 730, there are laser sources, photodetectors, chips for processing electrical signals, other circuitry, etc. To aid the alignment, a ledge structure is provided in a plane parallel to the plane tangential to, and passing through, the apex of the aspheric lenses of the collimating and optical subassemblies in the optical assembly 720. The ledge structure allows the PCB 730 to be inserted and to be parallel to the aspheric lenses within a few microns of tolerance.

Figure 9:
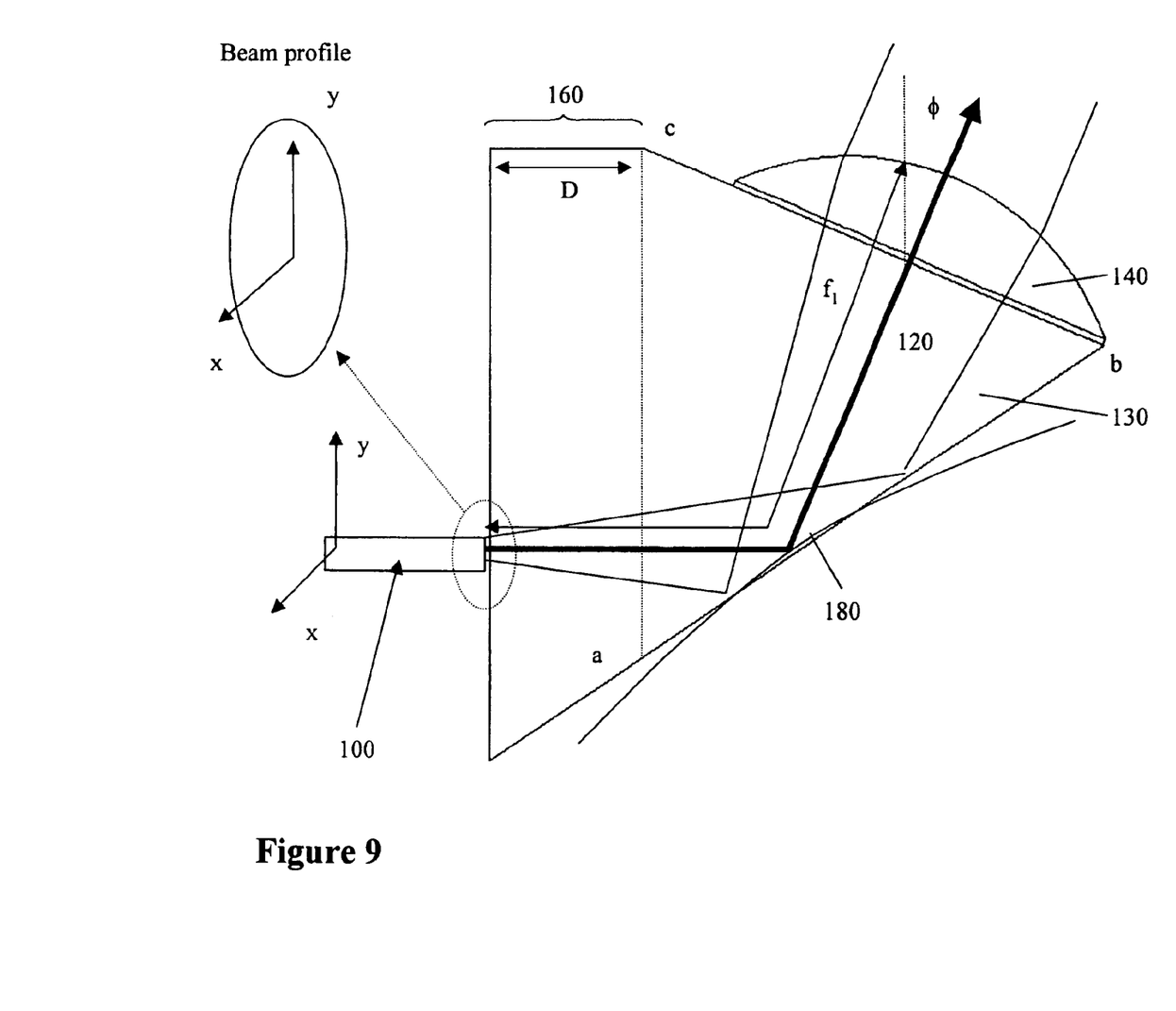
FIG. 9 illustrates an optical subassembly for redirecting and collimating output from an edge-emitting laser according to an embodiment of the present invention.

While the preferred implementation of the present invention utilizes a VCSEL as the optical source for each wavelength in the WDM transmitter, an edge-emitting laser (EEL) may alternatively be used. FIG. 9 illustrates an optical subassembly, and more particularly, a collimating element useful for redirecting and collimating output from an EEL 100 according to an embodiment of the present invention. Similar to the optical subassembly 100a depicted in FIG. 3a, the collimating element comprises an aspheric lens 140 and a prism 130 with a spacer 160. The divergent light beam 120 from the EEL 100 is redirected at a specific angle, $\phi$, relative to normal to the optical axis of the EEL 100 by TIR using a prism 130. The divergent beam 120 is then collimated using an aspheric lens 140.

The light beam 120 from the EEL 100 diverges faster along one axis than along the other. This is true for both Fabry-Perot (FP) type EELs and distributed feedback (DFB) type EELs. As a result, light from an EEL collimated by a simple lens produces an elliptical beam profile. In one implementation of the present invention, as shown in FIG. 9, a TIR surface 180 may be shaped so that it acts as a cylindrical lens. The TIR surface 180 can speed up the divergence of a slower axis and/or slow down the divergence of a faster axis. In the embodiment, the aspheric lens 140 may be toric, having a different focal length along each axis. The resultant beam, defined by the NA of the EEL 100, the TIR surface 180 and the aspheric lens 140 along each axis, may be designed to collimate both axes simultaneously while producing a beam of arbitrary ellipticity. In this case, the NA of the TIR surface 180 is flat along one axis and defined by a specific sag equation along the other, and the NA of the aspheric lens 140 is defined by a different sag equation along each axis. In other embodiments, the desired beam profile is circular or nearly circular.

An optical multiplexer based on optical subassemblies described in FIG. 3a and FIG. 9 may also be constructed, enabling the use of EELs as source lasers rather than VCSELs. The design is similar to that shown in FIG. 5b. In an alternative embodiment, the angle of the output beam in the "xy" plane defined in FIG. 9 may be controlled by rotating the TIR surface 180 about the "z" axis to any angle desired. When a rotation with $\phi=0°$ is implemented, the EELs emit in a direction orthogonal to the direction of the "zig-zag" scheme.

While the foregoing description refers to particular embodiments of the present invention, it will be understood that the particular embodiments have been presented for purposes of illustration and description. They are not intended to be exhaustive or to limit the invention to the precise forms disclosed. Many modifications and variations are possible in light of the above teachings and may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An integrated optical assembly, comprising:
   a fiber collimator that redirects and collimates a light beam from an optical source input, creating a collimated light beam;
   at least two focusing optical subassemblies, the at least two focusing optical subassemblies being aligned along a common axis;
   a connector housing that receives a fiber optical connector;
   a ledge structure adapted for positioning a printed circuit board, the printed circuit board being parallel to, and at a distance from, aspheric lenses of the focusing optical subassemblies when positioned on the ledge structure; and an optically transparent block that receives the collimated light beam from the fiber collimator, the optically transparent block having a top side coated to act as a reflective mirror and a bottom side including thin film filters (TFFs), each with a different passband wavelength and each being positioned over each focusing optical subassembly, the top side being the side opposite to at least one of the fiber collimator and the focusing optical subassemblies, wherein the collimated light beam travels in a zig-zag fashion within the optically transparent block, wavelength components of the collimated light beam being separated from each other by the TFFs with matching passband wavelengths and focused by the focusing optical subassemblies below the TFFs.

2. The integrated optical assembly of claim 1, wherein the integrated optical assembly is manufactured using injection molding of an optically transparent plastic.

3. The integrated optical assembly of claim 1, further comprising an optical multiplexer, wherein the connector housing receives a duplex optical fiber, and the printed circuit board also is parallel to, and at a distance from, aspheric lenses of collimating optical subassemblies of the optical multiplexer when positioned on the ledge structure.

4. The integrated optical assembly of claim 3, wherein the integrated optical assembly is manufactured using injection molding of an optically transparent plastic.

5. The integrated optical assembly of claim 3, wherein aspheric lenses of the focusing optical subassemblies have a different prescription than aspheric lenses of the collimating optical subassemblies, and an array of photodetectors and an array of point sources reside on the printed circuit board having different heights.

6. An optical multiplexer comprising:
a fiber coupler that redirects and couples a light beam with different wavelength components into an optical fiber;
at least two collimating optical subassemblies receiving light beams from different point sources, the at least two collimating optical subassemblies being aligned along a common axis;
an optically transparent block that receives light beams with different wavelength components, the optically transparent block having a top side coated to act as a reflective mirror and a bottom side including thin film filters (TFFs), each with a different passband wavelength and each being positioned over each collimating optical subassembly, the top side being the side opposite to at least one of the fiber coupler and the collimating optical subassemblies, wherein light beams from the point sources travel through the collimating optical subassemblies, the TTFs, the optically transparent block and the fiber coupler into the optical fiber, and wherein aspheric lenses for collimating and focusing a light beam diverging from one of the point sources having a particular sized aperture are used to project an image from the point source onto the fiber core with a controlled degree of magnification, which controls the sized aperture of the light beam delivered to the optical fiber and the resulting coupling efficiency.

7. An optical multiplexer comprising:
a fiber coupler that redirects and couples a light beam with different wavelength components into an optical fiber;
at least two collimating optical subassemblies receiving light beams from different point sources, the at least two collimating optical subassemblies being aligned along a common axis;
an optically transparent block that receives light beams with different wavelength components, the optically transparent block having a top side coated to act as a reflective mirror and a bottom side including thin film filters (TFFs), each with a different passband wavelength and each being positioned over each collimating optical subassembly, the top side being the side opposite to at least one of the fiber coupler and the collimating optical subassemblies, wherein light beams from the point sources travel through the collimating optical subassemblies, the TTFs, the optically transparent block and the fiber coupler into the optical fiber, and wherein aspheric lenses for collimating and focusing a light beam diverging from one of the point sources having a particular sized aperture are used to project an image from the point source onto the fiber core with a controlled degree of magnification, which controls the tolerance of the coupling efficiency into the optical fiber to a displacement of the point source.

8. An integrated optical subassembly, comprising:
a fiber coupler that redirects and couples a light beam with different wavelength components into an optical fiber;
at least two collimating elements that receives elliptically divergent light beams from edge-emitting lasers, the at least two collimating elements being aligned along a common axis and spaced so that the elliptically divergent light beams become redirected and collimated into circular or nearly circular light beams;
an optically transparent block that receives the circular or nearly circular light beams with different wavelength components, the optically transparent block having a top side coated to act as a reflective mirror and a bottom side including thin film filters (TFFs), each with a different passband wavelength and each being positioned over each collimating element, the top side being the side opposite to at least one of the fiber coupler and the collimating optical subassemblies, wherein the circular or nearly circular light beams travel through the TTFs, the optically transparent block and the fiber coupler into the optical fiber.

9. The integrated optical assembly of claim 8, further comprising:
a connector housing that receives a fiber optical connector; and
a ledge structure suitable for positioning a printed circuit board, the printed circuit board being parallel to, and at a distance from, aspheric lenses of the collimating elements when positioned on the ledge structure.

10. The integrated optical assembly of claim 9, further comprising an optical de-multiplexer, the connector housing receiving a duplex optical fiber; and the printed circuit board being parallel to, and at a distance from, aspheric lenses of focusing optical subassemblies of the optical de-multiplexer when positioned on the ledge structure.

11. The integrated optical assembly of claim 10, wherein the integrated optical assembly is manufactured using injection molding of an optically transparent plastic.

* * * * *